United States Patent

Oh et al.

(10) Patent No.: US 9,598,013 B2
(45) Date of Patent: Mar. 21, 2017

(54) DEVICE AND METHOD FOR DISPLAYING HEAD-UP DISPLAY (HUD) INFORMATION

(71) Applicant: Hyundai Autron Co., Ltd., Seongnam-si (KR)

(72) Inventors: Hyung Suk Oh, Yongin-si (KR); Byung Jik Keum, Seoul (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 70 days.

(21) Appl. No.: 14/566,444

(22) Filed: Dec. 10, 2014

(65) Prior Publication Data

US 2015/0168720 A1 Jun. 18, 2015

(30) Foreign Application Priority Data

Dec. 12, 2013 (KR) .................. 10-2013-0154417

(51) Int. Cl.
G09G 5/00 (2006.01)
B60R 1/00 (2006.01)
G02B 27/01 (2006.01)

(52) U.S. Cl.
CPC ............... B60R 1/00 (2013.01); G02B 27/01 (2013.01); B60R 2300/205 (2013.01);
(Continued)

(58) Field of Classification Search
CPC ..... B60R 1/00; B60R 1/0023; B62D 15/0295; G02B 27/01; G09G 5/00; G06F 3/02; G06F 3/041; G06F 3/045
(Continued)

(56) References Cited

U.S. PATENT DOCUMENTS

2003/0201895 A1* 10/2003 Harter, Jr. ............. B60K 37/02
340/575
2011/0102483 A1* 5/2011 Kanamori ............. G09G 3/002
345/690
(Continued)

FOREIGN PATENT DOCUMENTS

DE 10 2004 041 504 A1 3/2006
DE 10 2005 046 672 A1 4/2007
(Continued)

OTHER PUBLICATIONS

Deutsches Patent- und Markenamt, Office Action for German Patent Application No. 10 2014 117 854.8, Jul. 9, 2015.
(Continued)

Primary Examiner — Pegeman Karimi
(74) Attorney, Agent, or Firm — Mayer Brown LLP; Hyunho Park

(57) ABSTRACT

Disclosed herein is a device and method for displaying head-up display (HUD) information, including: a first sensing unit for detecting a surrounding brightness around a vehicle; a second sensing unit for detecting a background brightness of a background area in which the HUD information is displayed; and a control unit for comparing the surrounding brightness with the background brightness, and adjusting a brightness of the HUD information based on the background brightness when a brightness difference between the surrounding brightness and the background brightness is equal to or more than a predetermined reference value.

5 Claims, 3 Drawing Sheets

(WHEN A DIFFERENCE BETWEEN THE SURROUNDING BRIGHTNESS AND THE BACKGROUND BRIGHTNESS IS EQUAL TO OR MORE THAN A REFERENCE VALUE)

(AFTER ADJUSTING THE BRIGHTNESS OF HUD INFORMATION BASED ON THE BACKGROUND BRIGHTNESS)

(52) U.S. Cl.
CPC .. *B60R 2300/308* (2013.01); *G02B 2027/014* (2013.01); *G02B 2027/0118* (2013.01)

(58) Field of Classification Search
USPC .......................................................... 345/7
See application file for complete search history.

(56) References Cited

U.S. PATENT DOCUMENTS

| | | | |
|---|---|---|---|
| 2012/0224060 A1* | 9/2012 | Gurevich | ................. B60R 1/00 348/148 |
| 2014/0333647 A1* | 11/2014 | Lee | .................... G02B 27/0179 345/589 |
| 2015/0070158 A1* | 3/2015 | Hayasaka | ................. G01S 7/04 340/438 |

FOREIGN PATENT DOCUMENTS

| | | |
|---|---|---|
| DE | 10 2009 041 205 A1 | 3/2011 |
| JP | 2011-048375 A | 3/2011 |
| KR | 10-2008-0108835 A | 12/2008 |

OTHER PUBLICATIONS

Korean Intellectual Property Office, Notice of Allowance for Korean Patent Application No. 10-2013-0154417, Mar. 30, 2015.

* cited by examiner

DEVICE AND METHOD FOR DISPLAYING HEAD-UP DISPLAY (HUD) INFORMATION

CROSS-REFERENCES TO RELATED APPLICATIONS

The present application claims priority to Korean Patent application number 10-2013-0154417, filed on Dec. 12, 2013, which is incorporated by reference in its entirety.

BACKGROUND OF THE INVENTION

1. Field of the Invention

The present disclosure relates to a device and method for displaying Head-Up Display (HUD) information, and more particularly to a device and method for displaying HUD information in which the brightness of the HUD information to be displayed through the head-up display can be adaptively adjusted based on a background brightness on a location in which the HUD information is to be displayed.

2. Discussion of Related Art

Recently most vehicles have been mounted with a navigation system configured to provide a driver with a road guide to a destination. Also recently a vehicle mounted with a head-up display configured to project desired information on a windscreen of a vehicle is being released, thus allowing a driver to acquire the projected information while the driver sees forward through the windscreen. Further, a study on displaying certain information in the manner of Augmented Reality through a head-up display is being performed.

The Augmented Reality (AR) is a technology that shows a virtual image obtained by overlapping three-dimensional virtual objects on an image of the real world that a user sees with the eyes, and the Augmented Reality is also called Mixed Reality (MR) because it shows a single image obtained by mixing an image of the virtual world including the additional information with an image of the real world in real time.

However, a conventional head-up display device has always displayed the Head-Up Display (HUD) information with the same brightness, irrespective of a background brightness on a location in which the HUD information is to be displayed, i.e., irrespective of a change of the background brightness according to a change of a driving situation of a vehicle.

For example, a background on a location in which the HUD information is to be displayed may appear a road on which there is not a vehicle, a road with shadow formed by a preceding vehicle, or a back side (rear side) of a preceding vehicle when the preceding vehicle is near. Besides, various background situations may be formed on a location in which the HUD information is to be displayed, according to driving situations of the vehicle.

By the way, a conventional head-up display device has always displayed the HUD information with the same brightness, irrespective of a background brightness on a location in which the HUD information is to be displayed, or, adjusted a brightness of the HUD information through simply detecting a surrounding illumination. That is, when the surroundings was dark (e.g., in cloudy day, in the nighttime, etc), a brightness of the HUD information was decreased, and when the surroundings was bright (e.g., in sunny day, in the daytime, etc), a brightness of the HUD information was increased.

However, a conventional head-up display device has the disadvantages that a brightness of the HUD information can be adjusted irrespective of real driving situations, because a background on a location in which the HUD information is to be displayed may be dark (e.g., when in shadow) although the surroundings are bright practically in a real driving situation of a vehicle, and the background on the location in which the HUD information is to be displayed may be bright (e.g., when receiving the light from the headlights) although the surroundings are dark practically in the real driving situation of the vehicle. That is, a conventional head-up display has the disadvantages that the HUD information can be adjusted very bright, resulting in dazzling a driver to disturb the driving.

The related art of the present invention is disclosed in Korean Patent Laid-open Publication No. 10-2009-0076242 published on Jul. 13, 2009 and entitled "Head-up display device for vehicle and method for controlling operation thereof".

SUMMARY OF THE INVENTION

In view of the above, embodiments of the present invention has been made to solve the problems of the above-mentioned conventional head-up display device, and thus embodiments of the present invention are directed to a device and method for displaying Head-Up display (HUD) information in which a brightness of the HUD information to be displayed through the head-up display can be adaptively adjusted based on a background brightness on a location in which the HUD information is to be displayed.

A device for displaying HUD information according to an embodiment of the present invention may comprise: a first sensing unit for detecting a surrounding brightness around a vehicle; a second sensing unit for detecting a background brightness of a background area in which the HUD information is to be displayed; and a control unit for comparing the surrounding brightness with the background brightness and adjusting a brightness of the HUD information based on the background brightness when a brightness difference between the surrounding brightness and the background brightness is equal to or more than a predetermined reference value.

According to an embodiment of the device of the present invention, the first sensing unit may comprise at least one illumination detecting sensor or photosensor.

According to an embodiment of the device of the present invention, the second sensing unit may comprise at least one digital image sensor or long-distance illumination detecting sensor.

According to an embodiment of the device of the present invention, the control unit may display the HUD information whose brightness is adjusted based on the background brightness, on a windscreen in the manner of Augmented Reality so as to match with a real road on which a vehicle is currently running.

According to an embodiment of the device of the present invention, the control unit may adjust the brightness of the HUD information based on the surrounding brightness when the brightness difference between the surrounding brightness and the background brightness is below the predetermined reference value, and display the HUD information whose brightness is adjusted based on the surrounding brightness, on the windscreen in the manner of Augmented Reality in the manner that corresponds to a read road on which a vehicle is currently running.

A method for displaying HUD information according to an embodiment of the present invention may comprise: detecting, by a control unit, a surrounding brightness around a vehicle; detecting, by the control unit, a background brightness of a background area in which the HUD information is displayed; comparing, by the control unit, the surrounding brightness with the background brightness; and adjusting, by the control unit, a brightness of the HUD information based on the background brightness, when a brightness difference between the surrounding brightness and the background brightness is equal to or more than a predetermined reference value.

According to an embodiment of the method of the present invention, the brightness of the background area may be detected by processing by the control unit an image of a background area taken by at least one digital image sensor installed in a vehicle, or be detected by a long-distance illumination detecting sensor.

According to an embodiment of the method of the present invention, when the brightness difference between the surrounding brightness and the background brightness is below the predetermined reference value, the control unit may adjust the brightness of the HUD information based on the surrounding brightness.

According to an embodiment of the method according to an embodiment of the present invention, the method may further comprise displaying, by the control unit, the HUD information whose brightness is adjusted, on the windscreen in the manner of Augmented Reality so as to match with a real road on which a vehicle is currently running.

According to the present invention, a brightness of the HUD information can prevent driver's eyes from dazzling to aid driver's safety driving by adaptively adjusting the brightness of the information to be displayed through the head-up display based on a background brightness on a location in which the HUD information is to be displayed.

DETAILED DESCRIPTION

Embodiments of a device and method for displaying HUM information according to the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
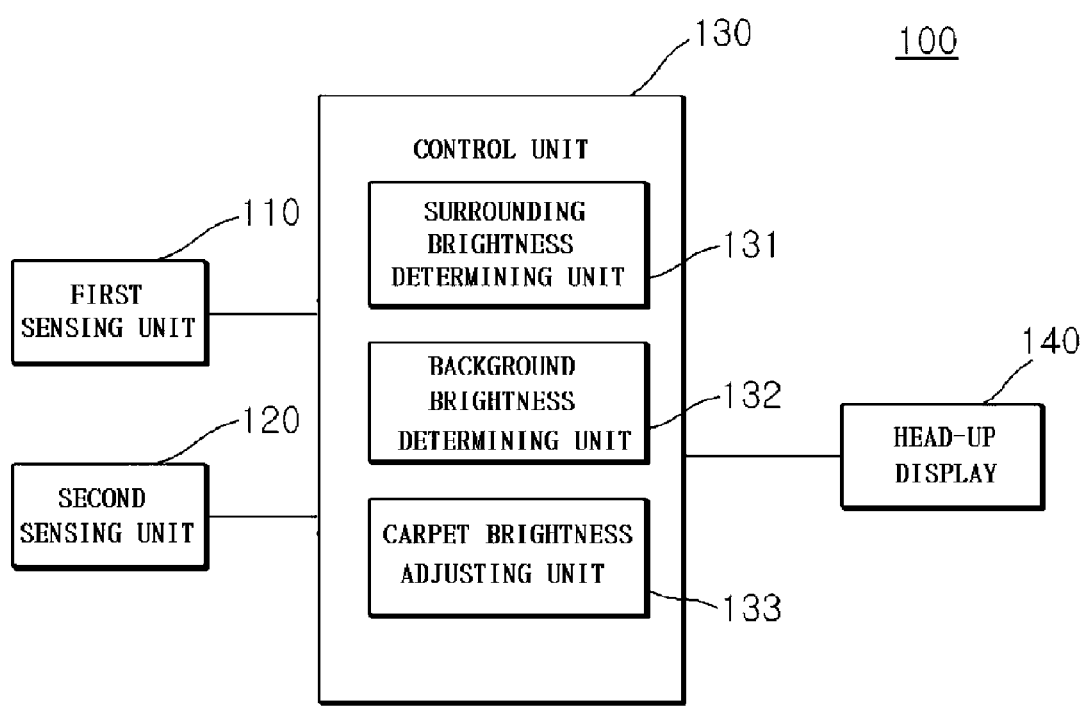
FIG. 1 is an illustrative diagram showing a schematic configuration of a device for displaying HUD information according to an embodiment of the present invention.

FIG. 1 is an illustrative diagram showing a schematic configuration of a device for displaying HUD information according to an embodiment of the present invention.

A device 100 for displaying HUD information as shown in FIG. 1 may include a first sensing unit 110, a second sensing unit 120, a control unit 130 and a head-up display 140.

The first sensing unit 110 may include at least one illumination detecting sensor (or photosensor).

The illumination detecting sensor may detect a surrounding brightness around a vehicle.

For example, the illumination detecting sensor may detect whether it is in the daytime or in the nighttime, or whether it is in sunny day or in cloudy day. That is, the illumination detecting sensor may detect how much it is overall dark or bright around a vehicle.

The second sensing unit 120 may include means for taking an image of objects in front of a vehicle, such as at least one camera including a digital image sensor. Alternatively, the second sensing unit 120 may include at least one long-distance illumination detecting sensor.

The second sensing unit 120 may acquire an image of objects in front of a vehicle by taking an image of the objects in a gazing direction (or in a driving direction of the vehicle). According to an embodiment, the second sensing unit 120 may be configured to take an image of the objects in front of a vehicle (in particular, the objects present on a location in which the HUD information is to be displayed), and detect a brightness of the image (i.e., a brightness of the background on a location in which the HUD information is to be displayed) by analyzing the image.

According to an embodiment of the present invention, a brightness of a background area may be detected by the second sensing unit 120, but in the following embodiments of the present invention will be described that the second sensing unit 120 is implemented as a camera installed in the vehicle.

For example, the camera may include a CMOS camera (or CCD camera).

For reference, the CMOS camera (or CCD camera) may acquire an image similar to that one sees with one's eyes because the CMOS camera senses the light of a visible range.

According to an embodiment, the second sensing unit 120 is configured to detect a brightness of a narrow area (in particular, an area in which the HUD information is to be displayed) in which the objects in front of a vehicle is occupied.

According to an embodiment, when outputting HUD information (e.g., vehicle lane changing carpet, road guiding carpet and the like), the above-mentioned brightness may be used as information for adjusting a brightness of the HUD information based on how much the image is dark or bright on a location (i.e., a background area) in which the HUD information is to be displayed.

Here, the term "carpet" refers to road guiding information including information for guiding a path (left turn, right turn, U turn, straight, etc) or information for assisting driver's safety driving (e.g., a vehicle speed, obstacles signs, etc) to be displayed on a windscreen in the manner of Augmented Reality so as to match with a real road as if the information was marked on a lane surface of the real road, and thus this carpet information is different from information for guiding road displayed simply in the windscreen (that is, information for guiding road displayed simply in the windscreen not so as to match with the real road).

The control unit 130 may include a surrounding brightness determining unit 131, a background brightness determining unit 132 and a carpet brightness adjusting unit 133.

The brightness determining unit 131, the background brightness determining unit 132 and the carpet brightness adjusting unit 133 may perform their functions separately. Alternatively, all the functions of the units 131~133 may be performed collectively in the control unit 130. For convenience, it is described below that the functions of the units 131~133 will be performed separately according to an embodiment.

The surrounding brightness determining unit 131 may determine a surrounding brightness around a vehicle by using information detected by the first sensing unit 110.

The background brightness determining unit 132 may process the image information taken by the second sensing unit 120 and determine a background brightness on a location (i.e., a background area) in which the HUD information is to be displayed.

The carpet brightness adjusting unit 133 may compare the surrounding brightness determined by the surrounding brightness determining unit 131 with the background brightness determined by the background brightness determining unit 132, and adjust a carpet brightness based on the background brightness determined by the background brightness determining unit 132 when a difference between the surrounding brightness and the background brightness is equal to or more than a predetermined reference value. That is, the carpet brightness adjusting unit 133 may adjust the brightness of the HUD information based on the background brightness and provide the head-up display 140 with the adjusted carpet brightness.

The information for adjusting the brightness of the HUD information based on the background brightness may be pre-stored in the form of look-up table in an internal memory (not shown).

The surrounding brightness determining unit 131, the background brightness determining unit 132 and the carpet brightness adjusting unit 133 may perform repeatedly the processes of continually detecting the brightness of the background area in front of the vehicle (a location in which the HUD information is to be displayed) and adjusting the brightness of the HUD information until driving of a vehicle is finished.

For example, when a surrounding brightness is dark, a brightness of the HUD information is decreased, and thereby dazzling a driver may be prevented. Also, when a surrounding brightness is bright, a brightness of the HUD information is increased, and thereby visibility of the HUD information by the driver may be enhanced.

However, when there is a difference between the surrounding brightness and the background brightness, i.e., when the surrounding brightness is bright and a brightness of the background area (a location in which the HUD information is to be displayed) is dark, a brightness of the HUD information is increased, and thereby dazzling of the driver may be increased.

Thus, according to an embodiment of the present invention, when a difference between the surrounding brightness and the background brightness is equal to or more than a certain reference value, as mentioned above, the brightness of the HUD information based on the background brightness that affects directly dazzling of the driver may be adjusted.

That is, although a difference between the surrounding brightness and the background brightness is equal to or more than a certain reference value, as mentioned above, dazzling of the driver due to the brightness of the HUD information may be prevented according to an embodiment of the present invention.

The head-up display 140 may display the HUD information whose brightness is adjusted based on the background brightness by the control unit 130, on the windscreen in the manner of Augmented Reality so as to match with the real road on which a vehicle is running currently.

In an embodiment, the "brightness" may be represented as an illumination, luminance, etc.

Figure 2:
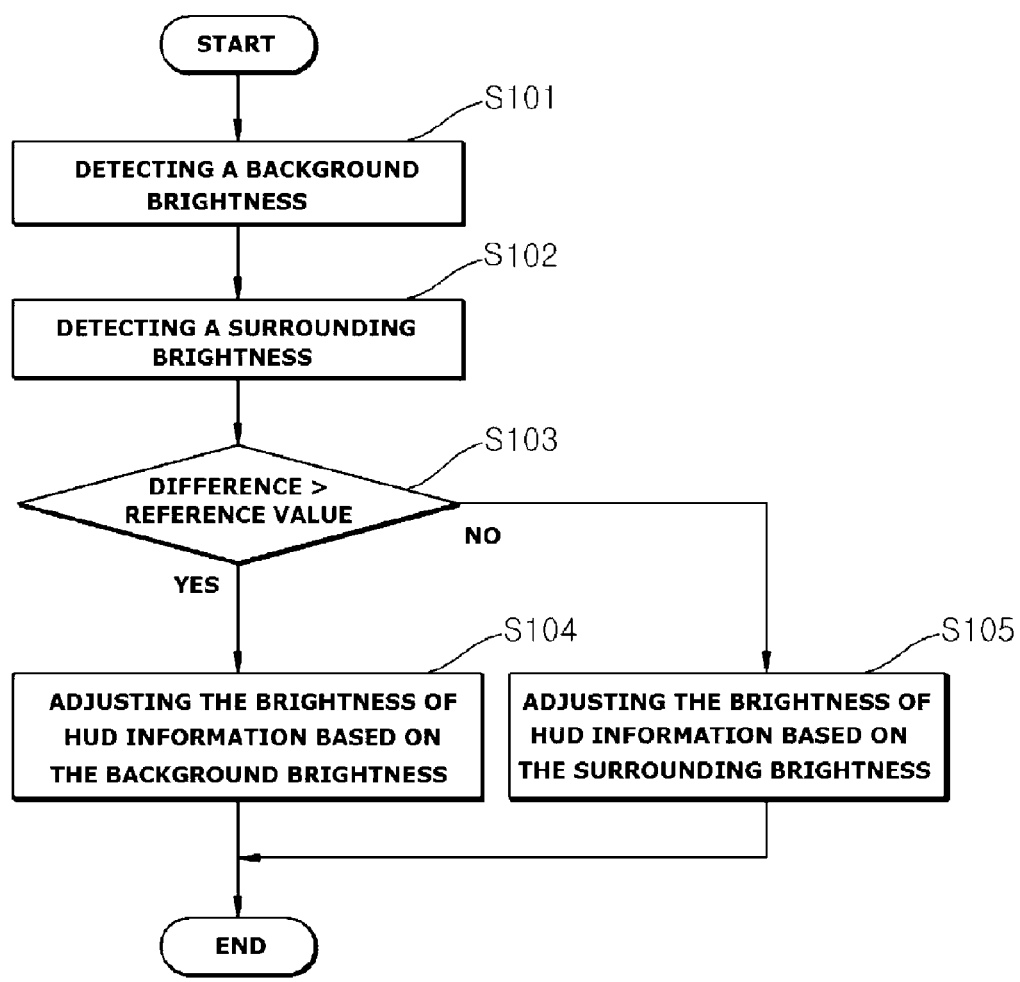
FIG. 2 is a flow chart for illustrating a method for displaying the HUD information according to an embodiment of the present invention.
Figure 3:
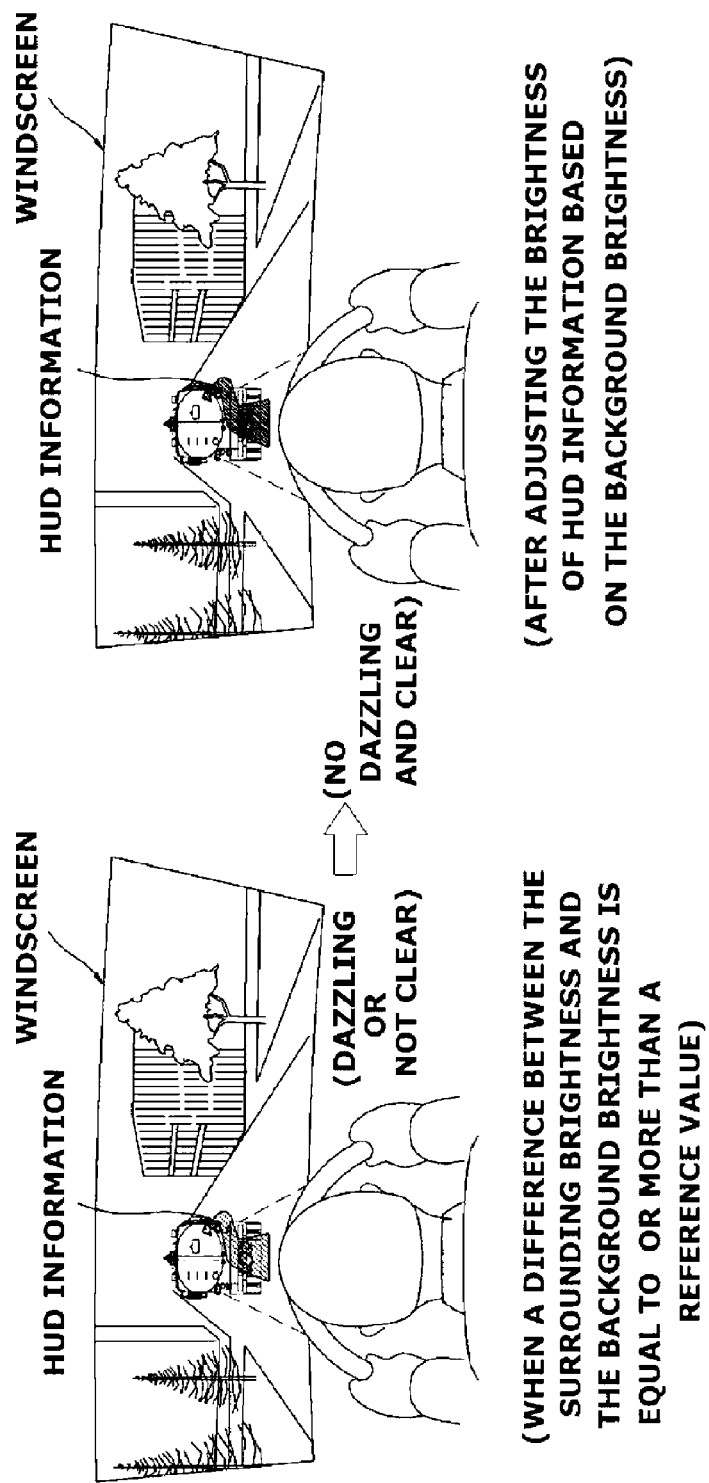
FIG. 3 is an illustrative diagram showing a method for displaying the HUD information based on a brightness of a background on a location in which the HUD information is to be displayed according to an embodiment of the present invention.

FIG. 2 is a flow chart for illustrating a method for displaying the HUD information according to an embodiment of the present invention. FIG. 3 is an illustrative diagram showing a method for displaying the HUD information based on a brightness of a background on a location in which the HUD information is to be displayed according to an embodiment of the present invention. In the following, a method for automatically adjusting and displaying the brightness of HUD information will be described with reference to FIG. 2 and FIG. 3.

As shown in FIG. 2, a control unit 130 may process the front image taken by a second sensing unit 120 installed in the vehicle and detect a brightness of a background (i.e., a location in which the HUD information is to be displayed) (S101).

Also, the control unit 130 may detect a surrounding brightness (illumination) around the vehicle by a first sensing unit 110 installed in a vehicle (S102).

Usually, although a difference between the surrounding brightness and the background brightness is not large, in a certain case (i.e., when surroundings is bright but there is a shadow in a background area, and then it appears to be dark, or when surroundings is dark but a light shines a background area, and then it appears to be bright), the difference between the surrounding brightness and the background brightness may be large.

In these cases, the control unit 130 may compare the surrounding brightness with the background brightness.

And then, the control unit 130 may determine if the brightness difference between the surrounding brightness and the background brightness is equal to or more than a predetermined reference value (S103).

For example, the control unit 130 may determine if surroundings around the vehicle is bright but the background area is darkened by a value equal to or more than the reference value, or if surroundings around the vehicle is dark but the background area is brightened by a value equal to or more than the reference value.

When a brightness difference between the surrounding brightness and the background brightness is equal to or more than the predetermined reference value as a result of the comparing (S103) ("YES" in S103), the control unit 130 may adjust the brightness of the HUD information based on a background brightness (S104). And, the control unit may display the HUD information whose brightness is adjusted based on the background brightness, on the windscreen in the manner of Augmented Reality so as to match with the real road on which a vehicle is currently running.

Then, a brightness difference between the surrounding brightness and the background brightness is below the predetermined reference value ("NO" in S103), the control unit 130 may adjust a brightness of the HUD information based on the surrounding brightness (S105). And the control unit may display the HUD information whose brightness is adjusted base on the surrounding brightness, on the windscreen in the manner of Augmented Reality so as to match with the real road on which a vehicle is currently running.

For example, as shown in FIG. 3, when a difference between the surrounding brightness around the vehicle and the background brightness of the background area in which the HUD information is to be displayed is equal to or more than the predetermined reference value, the control unit 130 may adjust a brightness of the HUD information based on the background brightness and display the HUD information on the windscreen in the manner of Augmented Reality in the manner that corresponds to the real road on which a vehicle is currently running.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A device for displaying head-up display (HUD) information, comprising:
   an illumination detecting sensor configured to detect a surrounding brightness around a vehicle;
   a camera configured to take an image of an object outside and in front of the vehicle, wherein the object appears on a location in which the HUD information is to be displayed; and
   a controller configured to:
   detect a background brightness on the location based on the image of the object,
   compare the surrounding brightness with the background brightness, and
   adjust a brightness of the HUD information based on the background brightness when a brightness difference between the surrounding brightness and the background brightness is equal to or more than a predetermined reference value,
   wherein the controller adjusts the brightness of the HUD information based on the surrounding brightness when the brightness difference between the surrounding brightness and the background brightness is below the predetermined reference value.

2. The device for displaying HUD information of claim 1, wherein the controller displays the HUD information whose brightness is adjusted based on the background brightness, in the manner of Augmented Reality so as to match with a real road on which a vehicle is currently running.

3. The device for displaying HUD information of claim 1, wherein the controller displays the HUD information whose brightness is adjusted based on the surrounding brightness, in the manner of Augmented Reality so as to match with a real road on which a vehicle is currently running.

4. A method for displaying head-up display (HUD) information, comprising:
   detecting, by an illumination detecting sensor, a surrounding brightness around a vehicle;
   taking, by a camera, an image of an object outside and in front of the vehicle, wherein the object appears on a location in which the HUD information is to be displayed;
   detecting, by a controller, a background brightness on the location based on the image of the object;
   comparing, by the controller, the surrounding brightness with the background brightness; and
   adjusting, by the controller, a brightness of the HUD information based on the background brightness, when a brightness difference between the surrounding brightness and the background brightness is equal to or more than a predetermined reference value,
   wherein when the brightness difference between the surrounding brightness and the background brightness is below the predetermined reference value, the controller adjusts the brightness of the HUD information based on the surrounding brightness.

5. The method for displaying HUD information of claim 4, further comprising displaying, by the controller, the HUD information whose brightness is adjusted, in the manner of Augmented Reality so as to match with a real road on which a vehicle is currently running.

* * * * *